March 11, 1930.  J. R. GAMMETER  1,750,263
MULTIPLE HEATING OR VULCANIZING PRESS
Filed March 20, 1928    2 Sheets-Sheet 2

Inventor
John R. Gammeter
By Ely & Barrow
Attys.

Patented Mar. 11, 1930

1,750,263

UNITED STATES PATENT OFFICE

JOHN R. GAMMETER, OF AKRON, OHIO

MULTIPLE HEATING OR VULCANIZING PRESS

Application filed March 20, 1928. Serial No. 263,077.

This invention relates to multiple heating or vulcanizing presses of that type comprising a series of spaced, jacketed platens adapted to receive the heating or vulcanizing molds or the goods to be treated in the spaces therebetween.

Heretofore, such presses have usually comprised a series of movable heated platens, pressure means for simultaneously urging them together and flexible couplings for supplying and draining of the fluid curing medium.

The general purpose of the present invention is to provide a press of the above type capable of independently applying pressure to molds or goods between the platens, whereby the several heating or vulcanizing operations performed in the press are independent of each other.

More particularly the invention has for its object the provision of a gang press including spaced, jacketed platens arranged to receive a fluid heating or curing medium therein under pressure and including movable platen faces thereon actuatable by the pressure of the heating or curing medium to apply pressure to the molds or goods arranged between the platens whereby use of extraneous pressure applying devices, flexible couplings, etc. are avoided and independent platen operation is secured.

The foregoing and other purposes or objects are attained in the vulcanizing press shown in the accompanying drawings and described below. It is to be understood that the invention is not limited to the particular form thereof shown and described.

Of the accompanying drawings.

Figure 1:
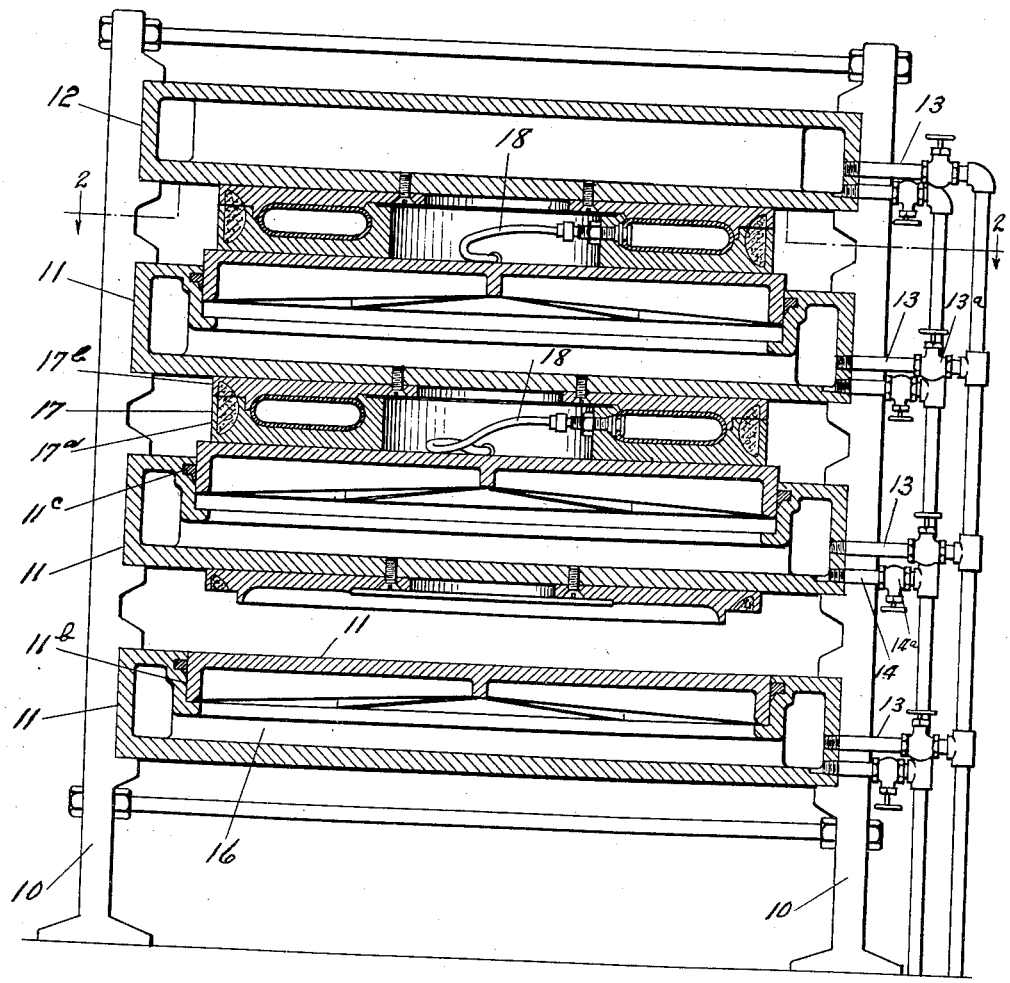
Figure 1 is a sectional elevation of a press embodying the invention.
Figure 2:
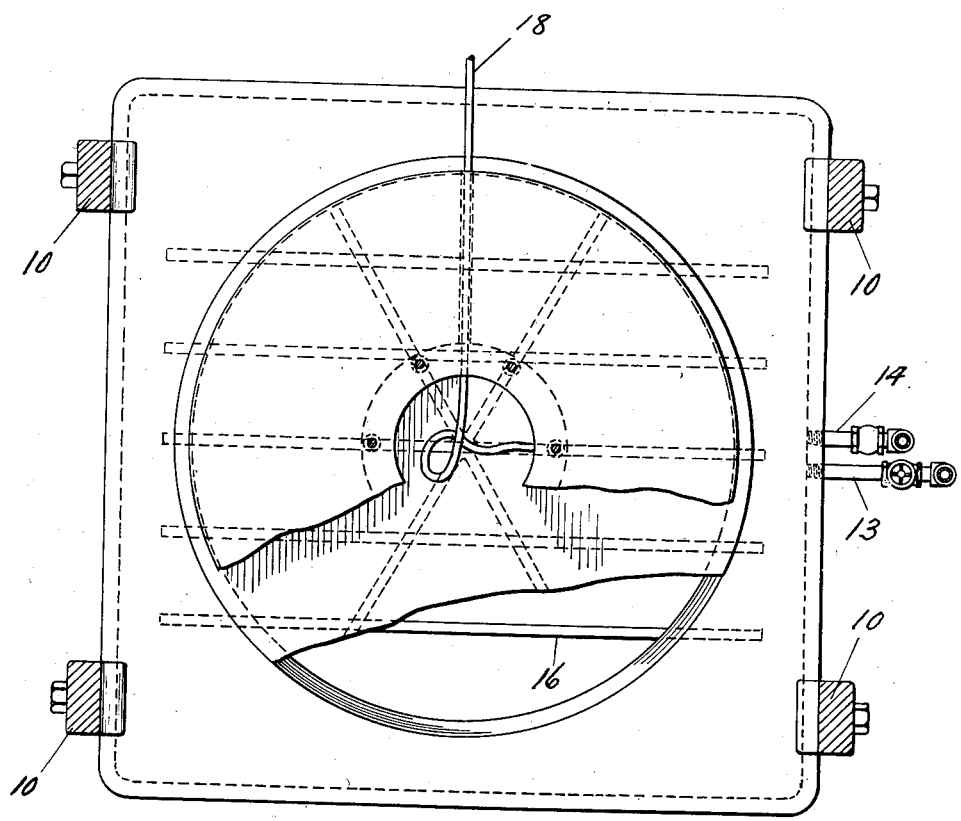
Figure 2 is a sectional plan thereof on line 2—2 of Figure 1 and partly broken away to illustrate interior construction of the platens.

Referring to the drawings, the numerals 10, 10 designate suitable supporting posts on which are mounted in vertically spaced relation, jacketed platen members 11, 11 and 12 to which steam, hot water or other fluid curing or treating medium can be supplied under pressure through connections 13, 13 from a supply line 14. Suitable drain connections 14, 14 connected to a drain line 15 may also be made to platens 11 and 12. Valves 13ª and 14ª are provided on connections 13 and 14 for independent operation of the platens.

Platens 11 are each provided with a pressure platen face 11ª, reciprocable in a cylinder 11ᵇ in communication with the interior of the jacket so as to be operable upwardly by pressure of the fluid therein, a suitable gasket 11ᶜ being provided to seal the jacket against leakage about the movable platen face. Transverse supporting webs 16, 16 are provided in each jacket between cylinder 11ᵇ and the bottom of the jacket.

In the particular embodiment of press shown, inner tube molds 17, 17 are utilized, the lower sections 17ª, 17ª of these molds preferably resting on platen faces 11ª and being slidable therefrom for removing the vulcanized tubes and inserting the uncured or "green" tubes. The upper mold sections 17ᵇ, 17ᵇ preferably are secured to the fixed under surfaces of platen members 11 and 12. The usual fluid pressure connections for expanding the inner tubes in the molds during vulcanization are indicated at 18, 18.

In use, the cooperating platens are independently operable, the illustration in Figure 1 showing two sets in operation vulcanizing tubes and a third set open, ready to receive a lower mold section 17ª with a green inner tube therein.

When this mold section is inserted in substantial alignment with the upper section 17ᵇ of the mold, the curing medium will be introduced into the jacket, forcing the platen face upwardly to urge the mold parts together, the heat and pressure of the curing medium in the jackets providing the necessary heat and pressure on the molds throughout the cure. When the cure is completed, the pressure in the platen is relieved, whereby the movable platen face may descend, permitting removal of the lower mold section with the vulcanized tube.

It will appear from the foregoing that a simple, but effective gang press has been provided whereby the use of extraneous means for pressing the platens together has been obviated, the use of flexible piping to movable platens has been overcome and the added and highly important advantage of independent operation of the cooperating platen faces has been secured without being deprived of the efficiency of the gang press with regard to conservation of labor, heat and floor space.

Obviously, modifications of the invention may be resorted to without departing from the spirit thereof or the scope of the appended claims.

What is claimed is:—

1. A heating or vulcanizing press comprising a series of spaced, jacketed platens adapted to receive the goods to be treated therebetween, and means for supplying a heating or curing medium to said platens, said platens having a movable platen face operable by pressure of the curing medium therein on at least one of each set of cooperating faces.

2. A vulcanizing press comprising a vertical series of spaced, jacketed platens arranged to receive the goods to be treated therebetween, and independent means for supplying a fluid heating medium to each platen, the under platen face of each platen having the upper section of a vulcanizing mold secured thereto and the upper platen face of each platen being adapted to removably receive the lower section of each vulcanizing mold, one platen face of each set of cooperating platen faces being reciprocable by pressure of the fluid curing medium in its jacket.

3. A vulcanizing press comprising a series of spaced, jacketed platens arranged to receive the goods to be treated therebetween, and means for supplying a fluid heating medium to each platen, one platen face of each platen having one section of a vulcanizing mold secured thereto and the other platen face of each platen being adapted to removably receive the other section of each vulcanizing mold, one platen face of each set of cooperating platen faces being reciprocable by pressure of the fluid curing medium in its jacket.

4. A heating or vulcanizing press comprising a series of spaced, fixed, jacketed platen members arranged to receive the goods to be treated in the spaces therebetween, and means for introducing a fluid heating or vulcanizing medium under pressure into said platens, at least one of each set of cooperating platen faces of said platens being movable and operable by pressure of the curing medium in the jackets to apply pressure to the goods between said platens during a heating or vulcanizing operation.

5. A heating or vulcanizing press comprising a series of spaced, jacketed platens adapted to receive the goods to be treated in the spaces therebetween, at least one of each set of cooperating faces of said platens being movable and its platen having a cylinder formed therein in communication with the interior of its jacket, the platen face member being reciprocable in said cylinder, gasket means about each member for sealing each said jacket, and means for introducing a fluid heating or vulcanizing medium under pressure into each platen.

6. A heating or vulcanizing press comprising a series of spaced, jacketed platens adapted to receive the goods to be treated in the spaces therebetween, each of said platens except at one end of the series having a cylinder formed therein in communication with the interior of its jacket and having a platen face member reciprocable in said cylinder, and means for introducing a fluid heating or vulcanizing medium under pressure into each platen.

7. A heating or vulcanizing press comprising a series of spaced, jacketed platens, and means for supplying a heating or curing medium to said jackets, said platens being operable by pressure of the curing medium therein independently to apply heat and pressure to goods in the respective spaces therebetween.

JOHN R. GAMMETER.